United States Patent
Ito et al.

(10) Patent No.: US 10,717,884 B2
(45) Date of Patent: Jul. 21, 2020

(54) RESIN SOLUTION COMPOSITION

(71) Applicant: Sumitomo Chemical Company, Limited, Tokyo (JP)

(72) Inventors: Kazuyuki Ito, Tsukuba (JP); Masanobu Matsubara, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/767,163

(22) PCT Filed: Oct. 7, 2016

(86) PCT No.: PCT/JP2016/079933
§ 371 (c)(1),
(2) Date: Apr. 10, 2018

(87) PCT Pub. No.: WO2017/065108
PCT Pub. Date: Apr. 20, 2017

(65) Prior Publication Data
US 2018/0298208 A1 Oct. 18, 2018

(30) Foreign Application Priority Data
Oct. 16, 2015 (JP) .................... 2015-204511

(51) Int. Cl.
| | | |
|---|---|---|
| *C09D 7/20* | (2018.01) | |
| *C08L 101/00* | (2006.01) | |
| *C08L 79/08* | (2006.01) | |
| *C08L 81/06* | (2006.01) | |
| *C09D 181/06* | (2006.01) | |

(52) U.S. Cl.
CPC ............... *C09D 7/20* (2018.01); *C08L 79/08* (2013.01); *C08L 81/06* (2013.01); *C08L 101/00* (2013.01); *C09D 181/06* (2013.01)

(58) Field of Classification Search
CPC ...................................... C08L 81/06
See application file for complete search history.

(56) References Cited

U.S. PATENT DOCUMENTS

| | | | | | |
|---|---|---|---|---|---|
| 4,448,957 | A * | 5/1984 | Ueno | .................... | C08G 73/14 528/125 |
| 4,970,034 | A * | 11/1990 | Ly | ....................... | B01D 69/06 210/500.41 |
| 5,137,992 | A * | 8/1992 | Kawakami | ........ | C08G 75/0209 525/537 |
| 5,317,082 | A * | 5/1994 | Beuhler | ............. | C08G 73/1039 528/353 |
| 6,881,337 | B2 * | 4/2005 | Meluch | .............. | B01D 67/0011 210/500.27 |
| 8,268,224 | B2 * | 9/2012 | Kohinata | .............. | C08G 65/40 264/465 |
| 2004/0026315 | A1 * | 2/2004 | Han | ........................ | A61M 1/16 210/500.41 |
| 2009/0047515 | A1 * | 2/2009 | Kohinata | .............. | C08G 65/40 428/364 |
| 2010/0240821 | A1 * | 9/2010 | Nakamura | ........... | C08G 18/603 524/538 |
| 2011/0311816 | A1 * | 12/2011 | Kanomata | ............. | C08G 65/40 428/402 |
| 2014/0378584 | A1 * | 12/2014 | Reynolds | .............. | C09D 5/002 524/84 |
| 2015/0183931 | A1 * | 7/2015 | Fujii | ..................... | C08G 69/00 525/436 |

FOREIGN PATENT DOCUMENTS

| | | |
|---|---|---|
| CN | 102086303 A | 6/2011 |
| EP | 2189487 A1 | 5/2010 |
| EP | 2902446 A1 | 8/2015 |
| EP | 2927282 A1 | 10/2015 |
| JP | 57094310 A | 6/1982 |
| JP | 57207506 A | 12/1982 |
| JP | 58180532 A | 10/1983 |
| JP | 61275352 A | 12/1986 |
| JP | 2002249664 A | 9/2002 |
| JP | 2002-332407 A | 11/2002 |
| JP | 2015504951 A | 2/2015 |
| WO | 2013106421 A1 | 7/2013 |

OTHER PUBLICATIONS

Office Action dated Mar. 21, 2017 in JP Application No. 2017-502906.
Int'l Search Report dated Dec. 6, 2016 in Int'l Application No. PCT/JP2016/079933.
Extended European Search Report dated Apr. 24, 2019 in EP Application No. 16855362.6.
Office Action dated Nov. 22, 2019 in CN Application No. 201680059286.8.

* cited by examiner

*Primary Examiner* — Liam J Heincer
(74) *Attorney, Agent, or Firm* — Panitch Schwarze Belisario & Nadel LLP (57) ABSTRACT

The present invention relates to a resin solution composition containing at least one resin selected from the group consisting of aromatic polysulfones, aromatic polyamideimides, aromatic polyetherimides, aromatic polyimides and aromatic polyamic acids, a sulfone-based solvent, and an ester-based solvent, wherein in this resin solution composition, an amount of the resin, relative to the total mass of the resin solution composition, is at least 10% by mass but not more than 50% by mass, and an amount of the ester-based solvent, relative to the total amount of the sulfone-based solvent and the ester-based solvent, is at least 15% by mass but not more than 85% by mass.

17 Claims, 1 Drawing Sheet

RESIN SOLUTION COMPOSITION

CROSS-REFERENCE TO RELATED APPLICATION

This application is a Section 371 of International Application No. PCT/JP2016/079933, filed Oct. 7, 2016, which was published in the Japanese language on Apr. 20, 2017, under International Publication No. WO 2017/065108 A1, which claims priority under 35 U.S.C. § 119(b) to Japanese Application No. 2015-204511, filed Oct. 16, 2015, the disclosures of which are incorporated herein by reference in their entirety.

TECHNICAL FIELD

The present invention relates to a resin solution composition.

Priority is claimed on Japanese Patent Application No. 2015-204511, filed Oct. 16, 2015, the content of which is incorporated herein by reference.

BACKGROUND ART

Polyethersulfones, polyamideimides, polyetherimides and polyimides not only have excellent heat resistance, but also exhibit good adhesion to metals and other polymers such as fluororesins, and are therefore used as film-forming agents.

One example of a method for this type of use is a known method that is employed when the surface of a metal substrate is to be coated with a fluororesin, wherein prior to the application of the fluororesin, a resin solution composition prepared by dissolving a resin such as a polyethersulfone in a solvent is adhered to the metal substrate, thereby forming a primer layer of the resin solution composition on the substrate surface.

Examples of known solvents for the above resin solution composition include solvents having Hansen solubility parameters that include a dispersion parameter δD (units: $MPa^{0.5}$) of at least 14.7 but not more than 20.3, a polar parameter δP (units: $MPa^{0.5}$) of at least 4.5 but not more than 18.4, and a hydrogen bonding parameter δH (units: $MPa^{0.5}$) of at least 4.3 but not more than 15.7. Disclosed examples of such solvents include sulfolane, N,N-dimethylformamide and γ-butyrolactone. However, resin solution compositions that use any of these solvents individually suffer from problems such as gelling and turbidity caused by the formation of precipitates (see Patent Documents 1 to 3).

PRIOR ART LITERATURE

Patent Documents

Patent Document 1: JP 2015-504951-A
Patent Document 2: JP 2002-332407-A
Patent Document 3: JP 2002-249664-A

SUMMARY OF INVENTION

Problems to be Solved by the Invention

Due to the above issues, a resin solution composition that exhibits no gelling or precipitate formation and has excellent storage stability would be desirable.

The present invention has been developed in light of these circumstances, and has an object of providing a resin solution composition that exhibits no gelling or precipitate formation and has excellent storage stability.

Means for Solving the Problems

The invention provides a resin solution composition containing at least one resin selected from the group consisting of aromatic polysulfones, aromatic polyamideimides, aromatic polyetherimides, aromatic polyimides and aromatic polyamic acids, a sulfone-based solvent, and an ester-based solvent, wherein the concentration of the resin in the resin solution composition is at least 10% by mass but not more than 50% by mass, and the concentration of the ester-based solvent in the mixed solvent composed of the sulfone-based solvent and the ester-based solvent is at least 15% by mass but not more than 85% by mass.

In one aspect of the present invention, the ester-based solvent is preferably γ-butyrolactone or γ-valerolactone.

In one aspect of the present invention, the ester-based solvent is preferably γ-butyrolactone.

The invention also provides a resin solution composition containing at least one resin selected from the group consisting of aromatic polysulfones, aromatic polyamideimides, aromatic polyetherimides, aromatic polyimides and aromatic polyamic acids, a sulfone-based solvent, and a ketone-based solvent, wherein the concentration of the resin in the resin solution composition is at least 10% by mass but not more than 50% by mass, and the concentration of the ketone-based solvent in the mixed solvent composed of the sulfone-based solvent and the ketone-based solvent is at least 20% by mass but not more than 42% by mass.

In one aspect of the present invention, the ketone-based solvent is preferably acetone or methyl ethyl ketone.

In one aspect of the present invention, the ketone-based solvent is preferably acetone.

A resin solution composition containing at least one resin selected from the group consisting of aromatic polysulfones, aromatic polyamideimides, aromatic polyetherimides, aromatic polyimides and aromatic polyamic acids, a sulfone-based solvent, an ester-based solvent, and a ketone-based solvent, wherein the concentration of the resin in the resin solution composition is at least 10% by mass but not more than 50% by mass, the concentration of the ester-based solvent in the mixed solvent composed of the sulfone-based solvent, the ester-based solvent and the ketone-based solvent is at least 15% by mass but not more than 85% by mass, and the concentration of the ketone-based solvent in the mixed solvent composed of the sulfone-based solvent, the ester-based solvent and the ketone-based solvent is not more than 42% by mass.

In one aspect of the present invention, the ester-based solvent is preferably γ-butyrolactone or γ-valerolactone.

In one aspect of the present invention, the ester-based solvent is preferably γ-butyrolactone.

In one aspect of the present invention, the ketone-based solvent is preferably acetone or methyl ethyl ketone.

In one aspect of the present invention, the ketone-based solvent is preferably acetone.

In one aspect of the present invention, the sulfone-based solvent is preferably sulfolane.

In one aspect of the present invention, the resin is preferably an aromatic polysulfone.

In one aspect of the present invention, the aromatic polysulfone preferably has a repeating unit represented by formula (1).

-Ph$^1$-SO$_2$-Ph$^2$-O— (1)

(Each of Ph$^1$ and Ph$^2$ independently represents a phenylene group, wherein each hydrogen atom on the phenylene group may be independently substituted with an alkyl group of 1 to 10 carbon atoms, an aryl group of 6 to 20 carbon atoms or a halogen atom.)

In other words, the present invention includes the following aspects.

[1] A resin solution composition containing at least one resin selected from the group consisting of aromatic polysulfones, aromatic polyamideimides, aromatic polyetherimides, aromatic polyimides and aromatic polyamic acids, a sulfone-based solvent, and an ester-based solvent, wherein
in the resin solution composition,
an amount of the resin, relative to the total mass of the resin solution composition, is at least 10% by mass but not more than 50% by mass, and
an amount of the ester-based solvent, relative to the total amount of the sulfone-based solvent and the ester-based solvent, is at least 15% by mass but not more than 85% by mass.
[2] The resin solution composition according to [1], wherein the ester-based solvent is γ-butyrolactone or γ-valerolactone.
[3] The resin solution composition according to [1], wherein the ester-based solvent is γ-butyrolactone.
[4] A resin solution composition containing at least one resin selected from the group consisting of aromatic polysulfones, aromatic polyamideimides, aromatic polyetherimides, aromatic polyimides and aromatic polyamic acids, a sulfone-based solvent, and a ketone-based solvent, wherein
in the resin solution composition,
an amount of the resin, relative to the total mass of the resin solution composition, is at least 10% by mass but not more than 50% by mass, and
an amount of the ketone-based solvent, relative to the total of the amount of the sulfone-based solvent and the amount of the ketone-based solvent, is at least 20% by mass but not more than 42% by mass.
[5] The resin solution composition according to [4], wherein the ketone-based solvent is acetone or methyl ethyl ketone.
[6] The resin solution composition according to [4], wherein the ketone-based solvent is acetone.
[7] A resin solution composition containing at least one resin selected from the group consisting of aromatic polysulfones, aromatic polyamideimides, aromatic polyetherimides, aromatic polyimides and aromatic polyamic acids, a sulfone-based solvent, an ester-based solvent, and a ketone-based solvent, wherein
in the resin solution composition,
an amount of the resin, relative to the total mass of the resin solution composition, is at least 10% by mass but not more than 50% by mass,
an amount of the ester-based solvent, relative to the total amount of the sulfone-based solvent, the ester-based solvent and the ketone-based solvent, is at least 15% by mass but not more than 85% by mass, and
an amount of the ketone-based solvent, relative to the total amount of the sulfone-based solvent, the ester-based solvent and the ketone-based solvent, is not more than 42% by mass.
[8] The resin solution composition according to [7], wherein the ester-based solvent is γ-butyrolactone or γ-valerolactone.
[9] The resin solution composition according to [7], wherein the ester-based solvent is γ-butyrolactone.
[10] The resin solution composition according to any one of [7] to [9], wherein the ketone-based solvent is acetone or methyl ethyl ketone.
[11] The resin solution composition according to any one of [7] to [9], wherein the ketone-based solvent is acetone.
[12] The resin solution composition according to any one of [1] to [11], wherein the sulfone-based solvent is sulfolane.
[13] The resin solution composition according to any one of [1] to [12], wherein the resin is an aromatic polysulfone.
[14] The resin solution composition according to any one of [1] to [13], wherein the aromatic polysulfone has a repeating unit represented by formula (1) shown below:

-Ph$^1$-SO$_2$-Ph$^2$-O— (1)

(wherein each of Ph$^1$ and Ph$^2$ independently represents a phenylene group; and each hydrogen atom on the phenylene group may be independently substituted with an alkyl group of 1 to 10 carbon atoms, an aryl group of 6 to 20 carbon atoms or a halogen atom).

Effects of the Invention

Aspects of the present invention provide a resin solution composition that exhibits no gelling or precipitate formation and has excellent storage stability

EMBODIMENTS FOR CARRYING OUT THE INVENTION

<Resin Solution Composition>

A resin solution composition that represents one embodiment of the present invention contains at least one resin selected from the group consisting of aromatic polysulfones, aromatic polyamideimides, aromatic polyetherimides, aromatic polyimides and aromatic polyamic acids; a sulfone-based solvent; and an ester-based solvent, or a ketone-based solvent, or both an ester-based solvent and a ketone-based solvent.

The resin pertaining to the resin solution composition that represents one embodiment of the present invention is at least one resin selected from the group consisting of aromatic polysulfones, aromatic polyamideimides, aromatic polyetherimides, aromatic polyimides and aromatic polyamic acids. Among these, because of superior levels of chemical resistance and creep resistance, the resin is preferably an aromatic polysulfone.

Examples of the aromatic polysulfone pertaining to the resin solution composition of this embodiment include resins that typically have a repeating unit containing a divalent aromatic group (namely, a residue formed from an aromatic compound from which two hydrogen atoms bonded to the aromatic ring have been removed), a sulfonyl group (—SO$_2$—), and an oxygen atom.

In terms of the heat resistance and the chemical resistance, the aromatic polysulfone preferably has a repeating unit represented by formula (1) shown below (hereinafter also referred to as the "repeating unit (1)"). In this description, an aromatic polysulfone having the repeating unit (1) is termed an aromatic polyethersulfone. Moreover, the aromatic polysulfone pertaining to the resin solution composition of this embodiment may also have at least one other repeating unit such as a repeating unit represented by formula (2) shown below (hereinafter also referred to as the "repeating unit (2)"), or a repeating unit represented by formula (3) shown below (hereinafter also referred to as the "repeating unit (3)").

-Ph$^1$-SO$_2$-Ph$^2$-O—       (1)

In formula (1), each of Ph$^1$ and Ph$^2$ independently represents a phenylene group, wherein one hydrogen atom on the phenylene group may be substituted with an alkyl group of 1 to 10 carbon atoms, an aryl group of 6 to 20 carbon atoms or a halogen atom, and when two or more hydrogen atoms on the phenylene group are substituted, each hydrogen atom may be independently substituted with an alkyl group of 1 to 10 carbon atoms, an aryl group of 6 to 20 carbon atoms or a halogen atom.

-Ph$^3$-R-Ph$^4$-O—       (2)

In formula (2), each of Ph$^3$ and Ph$^4$ independently represents a phenylene group, wherein one hydrogen atom on the phenylene group may be substituted with an alkyl group of 1 to 10 carbon atoms, an aryl group of 6 to 20 carbon atoms or a halogen atom, and when two or more hydrogen atoms on the phenylene group are substituted, each hydrogen atom may be independently substituted with an alkyl group of 1 to 10 carbon atoms, an aryl group of 6 to 20 carbon atoms or a halogen atom; and R represents an alkylidene group of 1 to 5 carbon atoms, an oxygen atom or a sulfur atom.

-(Ph$^5$)$_n$-O—       (3)

In formula (3), Ph$^5$ represents a phenylene group, wherein one hydrogen atom on the phenylene group may be substituted with an alkyl group of 1 to 10 carbon atoms, an aryl group of 6 to 20 carbon atoms or a halogen atom, and when two or more hydrogen atoms on the phenylene group are substituted, each hydrogen atom may be independently substituted with an alkyl group of 1 to 10 carbon atoms, an aryl group of 6 to 20 carbon atoms or a halogen atom; n represents an integer of 1 to 3, and when n is 2 or greater, the plurality of Ph$^5$ groups may be the same or different.

In the above formulas (1) to (3), the phenylene group represented by any one of Ph$^1$ to Ph$^5$ may be a p-phenylene group, an m-phenylene group or an o-phenylene group, but is preferably a p-phenylene group.

Examples of the alkyl group of 1 to 10 carbon atoms that may substitute a hydrogen atom of the above phenylene group include a methyl group, ethyl group, n-propyl group, isopropyl group, n-butyl group, isobutyl group, sec-butyl group, tert-butyl group, n-pentyl group, n-hexyl group, n-heptyl group, 2-ethylhexyl group, n-octyl group and n-decyl group.

Examples of the aryl group of 6 to 20 carbon atoms that may substitute a hydrogen atom of the above phenylene group include a phenyl group, o-tolyl group, m-tolyl group, p-tolyl group, 1-naphthyl group and 2-naphthyl group.

Examples of the halogen atom that may substitute a hydrogen atom of the above phenylene group include a fluorine atom, chlorine atom, bromine atom and iodine atom.

In those cases where a hydrogen atom of the phenylene group has been substituted with one of these groups, the number of substituent groups per phenylene group is, independently, preferably not more than two, and is more preferably one.

In the above formula (2), examples of the alkylidene group of 1 to 5 carbon atoms represented by R include a methylene group, ethylidene group, isopropylidene group and 1-butylidene group.

The aromatic polysulfone pertaining to the resin solution composition of this embodiment preferably includes the repeating unit (1) in an amount which, relative to the total of all the repeating units that constitute the aromatic polysulfone, is preferably at least 50 mol % but not more than 100 mol %, and more preferably at least 80 mol % but not more than 100 mol %, and an aromatic polysulfone in which the repeating units are substantially only the repeating unit (1) (namely, 100 mol %) is even more desirable.

The aromatic polysulfone pertaining to the resin solution composition of this embodiment may contain at least two types of each of the repeating units (1) to (3).

The reduced viscosity (units: dL/g) of the aromatic polysulfone pertaining to the resin solution composition of this embodiment is preferably at least 0.10 but not more than 1.0, and more preferably at least 0.22 but not more than 0.80. Provided the reduced viscosity (units: dL/g) is within the above range, a stable aromatic polysulfone resin solution composition that is suitable for film formation can be obtained more easily, and the composition can be more easily prepared as a uniform solution. Moreover, filtration and degassing of this resin solution composition are easy, and the external appearance of the obtained film also tends to be favorable.

In this description, the "reduced viscosity" is measured using the following method.

About 1 g of the resin that represents the measurement target is dissolved in N,N-dimethylformamide to prepare a solution having a volume of 1 dL, and the concentration (C) (units: g/dL) of the solution is calculated. The viscosity ($\eta$) of the prepared solution is measured at 25° C. using an Ostwald viscosity tube. The viscosity ($\eta_0$) of N,N-dimethylformamide is also measured at 25° C. using an Ostwald viscosity tube. Based on the viscosity ($\eta$) of the solution and the viscosity ($\eta_0$) of N,N-dimethylformamide, the specific viscosity is calculated in accordance with the following formula.

$$\text{Specific viscosity} = (\eta - \eta_0)/\eta_0$$

The value obtained by dividing the specific viscosity by the concentration (C) of the solution is deemed the reduced viscosity (units: dL/g).

In the resin solution composition of this embodiment, the sulfone-based solvent, and the ester-based solvent, ketone-based solvent, or both ester-based solvent and ketone-based solvent, are mixed together and used in the form of a mixed solvent for dissolving the above resin.

In this embodiment, examples of the sulfone-based solvent include sulfolane, dimethylsulfone and diphenylsulfone, but sulfolane is preferable.

In this embodiment, a single type of sulfone-based solvent may be used alone, or a combination of two or more types may be used.

Examples of the ester-based solvent pertaining to this embodiment include methyl formate, ethyl formate, butyl formate, methyl acetate, ethyl acetate, butyl acetate, methoxybutyl acetate, isobutyl acetate, sec-butyl acetate, methoxymethyl acetate, cellosolve acetate, amyl acetate, isoamyl acetate, normal propyl acetate, isopropyl acetate, ethyl lactate, methyl lactate, butyl lactate, dimethyl carbonate, diethyl carbonate, ethyl methyl carbonate, propylene carbonate, ethylene carbonate, γ-butyrolactone, γ-valerolactone and δ-valerolactone. Among these, γ-butyrolactone and γ-valerolactone are preferable.

Examples of the ketone-based solvent pertaining to this embodiment include acetone, methyl ethyl ketone, diethyl ketone, methyl isobutyl ketone, diisobutyl ketone, cyclopentanone, cyclohexanone, methylcyclohexanone, diacetone alcohol, isophorone and camphor. Among these, acetone and methyl ethyl ketone are preferable.

In this embodiment, the ester-based solvent or the ketone-based solvent is preferably miscible with water. Examples of the above-mentioned ester-based solvents that are miscible with water include γ-butyrolactone, γ-valerolactone and δ-valerolactone. Further, an example of an above-mentioned ketone-based solvent that is miscible with water is acetone. This enables the resin solution composition to be dissolved or dispersed in water, or diluted with water. In those cases where the resin solution composition is mixed with water, the dilution concentration of the resin solution composition is, for example, preferably from 2-fold to 100-fold. A desired coating film can be obtained by using roll coating, dip coating, mist coating, or another conventional technique to apply the mixture prepared using the method described above.

In this embodiment, a single type of ester-based solvent or ketone-based solvent may be used alone, or a combination of two or more types may be used.

The amount of resin in the resin solution composition according to this embodiment, relative to the total mass of the resin solution composition, is at least 10% by mass but not more than 50% by mass, and is preferably at least 10% by mass but not more than 40% by mass, and more preferably at least 10% by mass but not more than 20% by mass. If the amount of resin is less than 10% by mass, then convection currents may occur in the resin solution composition during the initial stages of drying, causing orange peel that results in a deterioration in the surface smoothness of the obtained film. Further, if the amount of resin exceeds 50% by mass, then the viscosity of the resin solution composition tends to become extremely high, making handling difficult. In other words, provided the amount of resin is at least 10% by mass, the generation of orange peel due to the occurrence of convection currents in the resin solution composition during the initial stages of drying can be suppressed, thereby improving the surface smoothness of the obtained film, and provided the amount is not more than 50% by mass, the viscosity of the resin solution composition does not become overly high, meaning handling is easier.

In the resin solution composition according to this embodiment, the total amount of the sulfone-based solvent and the at least one solvent selected from the group consisting of ester-based solvents and ketone-based solvents, relative to the total mass of the resin solution composition, is preferably at least 50% by mass but not more than 90% by mass.

In those cases where the resin solution composition of this embodiment contains a sulfone-based solvent and an ester-based solvent, the amount of the ester-based solvent, relative to the total amount of the sulfone-based solvent and the ester-based solvent, is at least 15% by mass but not more than 85% by mass, and is preferably at least 20% by mass but not more than 80% by mass, more preferably at least 24% by mass but not more than 76% by mass, and particularly preferably at least 25% by mass but not more than 75% by mass. When the amount of the ester-based solvent is a concentration of less than 15% by mass, the solubility of the resin deteriorates, and solidification of the resin solution composition may occur. Further, if the amount of the ester-based solvent exceeds 85% by mass, then the storage stability of the resin solution composition deteriorates, and gelling may occur. In other words, provided the amount of the ester-based solvent is at least 15% by mass, the solubility of the resin improves, and solidification of the resin solution composition is unlikely, whereas provided the amount is not more than 85% by mass, the storage stability of the resin solution composition improves, and gelling becomes less likely.

In those cases where the resin solution composition of this embodiment contains a sulfone-based solvent and a ketone-based solvent, the amount of the ketone-based solvent, relative to the total of the amount of the sulfone-based solvent and the amount of the ketone-based solvent, is at least 20% by mass but not more than 42% by mass, and is preferably at least 22% by mass but not more than 40% by mass, more preferably at least 24% by mass but not more than 38% by mass, and particularly preferably at least 25% by mass but not more than 37.5% by mass. If the amount of the ketone-based solvent is less than 20% by mass, then the storage stability of the resin solution composition and the solubility of the resin tend to deteriorate, and solidification or gelling of the resin solution composition may occur. Further, if the amount of the ketone-based solvent exceeds 42% by mass, then the solubility of the resin deteriorates, and turbidity may occur. In other words, provided the amount of the ketone-based solvent is at least 20% by mass, the storage stability of the resin solution composition and the solubility of the resin improve, making solidification or gelling of the resin solution composition unlikely, whereas provided the amount is not more than 42% by mass, the solubility of the resin improves, and turbidity becomes less likely.

In this description, "gelling" means the development of a state in which the resin solution composition has no fluidity at normal temperature and in an open atmosphere.

"Solidification" means the development of a state in which the resin solution composition becomes a white solid with no fluidity.

"Turbidity" means a state in which although the resin solution composition has fluidity, white cloudiness exists in the resin solution composition at normal temperature and in an open atmosphere.

The expressions "the storage stability is high", "improvement in the storage stability" and "excellent storage stability" mean a state in which uniform transparency is maintained and no gelling occurs even after storage for at least one week at normal temperature (for example, 5 to 35° C.).

"Uniform transparency" means a state in which no turbidity exists in the resin solution composition.

The existence or absence of fluidity and the existence or absence of turbidity are determined by visual inspection.

Furthermore, in the resin solution composition of this embodiment, a mixed solvent that combines an above-mentioned sulfone-based solvent, ester-based solvent and ketone-based solvent may also be used. In those cases where a mixed solvent that combines an above-mentioned sulfone-based solvent, ester-based solvent and ketone-based solvent is used, the amount of the ester-based solvent in the resin solution composition, relative to the total amount of the sulfone-based solvent, the ester-based solvent and the ketone-based solvent, is at least 15% by mass but not more than 85% by mass, and is preferably at least 20% by mass but not more than 85% by mass. Further, the amount of the ketone-based solvent in the resin solution composition, relative to the total amount of the sulfone-based solvent, the ester-based solvent and the ketone-based solvent, is not more than 42% by mass, and the amount of the ketone-based solvent is preferably 0.001% by mass.

The resin solution composition of the present embodiment may be stored and handled at any temperature not higher than the boiling point of the solvent. This resin solution composition is preferably stored at normal temperature (for example, 5 to 35° C.) that requires no heating, warming or cooling.

Moreover, various additives such as leveling agents and plasticizers may also be added to the resin solution composition of this embodiment, provided they do not impair the effects of the present invention. Acrylic-based, silicone-based and fluorine-based leveling agents may be used as leveling agents. Preferred plasticizers include those that exhibit good compatibility with aromatic polysulfone resins, do not suffer from phase separation or bleed-out, and do not cause coloration. Examples include phthalate-based, phosphate-based, adipate-based, citrate-based and glycolate-based plasticizers, and butylbenzyl phthalate, tricresyl phosphate, and methyl phthalyl ethyl glycolate and the like can be used favorably. The amount of the above additives, relative to the total mass of the resin solution composition, is preferably at least 0.0001% by mass but not more than 10% by mass.

<Method for Producing Resin Solution Composition>

A method for producing a resin solution composition containing an aromatic polysulfone is described as one example of a method for producing the resin solution composition according to the present embodiment. A conventional method may be employed as the method used for producing the aromatic polysulfone. Further, a commercially available aromatic polysulfone may also be used as is. Examples of commercially available aromatic polysulfones include compounds formed solely from the repeating unit (1) (namely, the repeating unit (1) represents 100 mol %), such as SUMIKAEXCEL PES4100P (manufactured by Sumitomo Chemical Company, Limited, a polyethersulfone, reduced viscosity: 0.41 dL/g). Further, the terminal structures of these aromatic polysulfones are determined in accordance with the particular resin production method used, and although there are no particular limitations, examples include —Cl, —OH and —OR (wherein R represents an alkyl group).

Furthermore, there are no particular limitations on the method for producing the resin solution composition, and the solvent may be added to the resin, or the resin may be added to the solvent. In order to increase the dissolution rate, the resin is preferably used in the form of a powder, but his is not a specific limitation.

For example, the method for producing the resin solution composition may include adding the resin to the solvent, and then dissolving the resin by heating at 40 to 120° C. for 0.5 to 24 hours, while performing stirring if necessary.

The present invention provides a resin solution composition which exhibits no occurrence of gelling or precipitation and has excellent storage stability.

Another aspect of the resin solution composition of the present invention is a resin solution composition containing:
  an aromatic polysulfone,
  preferably an aromatic polysulfone having the aforementioned repeating unit (1),
  and more preferably an aromatic polysulfone having only the repeating unit (1);
  at least one sulfone-based solvent selected from the group consisting of sulfolane, dimethylsulfone and diphenylsulfone,
  and preferably sulfolane; and
  at least one ester-based solvent selected from the group consisting of γ-butyrolactone and γ-valerolactone; wherein
    within the resin solution composition,
    an amount of the aromatic polysulfone, relative to the total mass of the resin solution composition, is at least 10% by mass but not more than 50% by mass,
    preferably at least 10% by mass but not more than 40% by mass, and
    more preferably at least 10% by mass but not more than 20% by mass;
    a total amount of the sulfone-based solvent and the ester-based solvent, relative to the total mass of the resin solution composition, is at least 50% by mass but not more than 90% by mass:
    an amount of the ester-based solvent, relative to the total amount of the sulfone-based solvent and the ester-based solvent, is at least 15% by mass but not more than 85% by mass,
    preferably at least 20% by mass but not more than 80% by mass,
    more preferably at least 24% by mass but not more than 76% by mass, and
    particularly preferably at least 25% by mass but not more than 75% by mass; and
    a total amount of all the components does not exceed 100% by mass.

Yet another aspect of the resin solution composition of the present invention is a resin solution composition containing:
  an aromatic polysulfone,
  preferably an aromatic polysulfone having the aforementioned repeating unit (1),
  and more preferably an aromatic polysulfone having only the repeating unit (1);
  at least one sulfone-based solvent selected from the group consisting of sulfolane, dimethylsulfone and diphenylsulfone,
  and preferably sulfolane; and
  at least one ketone-based solvent selected from the group consisting of acetone and methyl ethyl ketone; wherein
    within the resin solution composition,
    an amount of the aromatic polysulfone, relative to the total mass of the resin solution composition, is at least 10% by mass but not more than 50% by mass,
    preferably at least 10% by mass but not more than 40% by mass, and
    more preferably at least 10% by mass but not more than 20% by mass:
    a total amount of the sulfone-based solvent and the ketone-based solvent, relative to the total mass of the resin solution composition, is at least 50% by mass but not more than 90% by mass;
    an amount of the ketone-based solvent, relative to the total amount of the sulfone-based solvent and the ketone-based solvent, is at least 20% by mass but not more than 42% by mass,
    preferably at least 22% by mass but not more than 40% by mass,
    more preferably at least 24% by mass but not more than 38% by mass, and
    particularly preferably at least 25% by mass but not more than 37.5% by mass; and
    a total amount of all the components does not exceed 100% by mass.

Another aspect of the resin solution composition of the present invention is a resin solution composition containing:
  an aromatic polysulfone,
  preferably an aromatic polysulfone having the aforementioned repeating unit (1),
  and more preferably an aromatic polysulfone having only the repeating unit (1);

at least one sulfone-based solvent selected from the group consisting of sulfolane, dimethylsulfone and diphenylsulfone, and preferably sulfolane;

at least one ester-based solvent selected from the group consisting of γ-butyrolactone and γ-valerolactone; and at least one ketone-based solvent selected from the group consisting of acetone and methyl ethyl ketone; wherein within the resin solution composition, an amount of the aromatic polysulfone, relative to the total mass of the resin solution composition, is at least 10% by mass but not more than 50% by mass, preferably at least 10% by mass but not more than 40% by mass, and more preferably at least 10% by mass but not more than 20% by mass:

a total amount of the sulfone-based solvent, the ester-based solvent and the ketone-based solvent, relative to the total mass of the resin solution composition, is at least 50% by mass but not more than 90% by mass;

an amount of the ester-based solvent, relative to the total amount of the sulfone-based solvent, the ester-based solvent and the ketone-based solvent, is at least 15% by mass but not more than 85% by mass, and an amount of the ketone-based solvent, relative to the total amount of the sulfone-based solvent, the ester-based solvent and the ketone-based solvent, is not more than 42% by mass; and a total amount of all the components does not exceed 100% by mass.

EXAMPLES

The present invention is described below in further detail using a series of examples and comparative examples relating to a method for producing the resin solution composition, but the present invention is in no way limited by these examples. An aromatic polysulfone was used in the examples and comparative examples. Further, in the examples, the resin solution composition according to the present invention is sometimes referred to as simply "the solution".

For the resin solution compositions of the examples and the comparative examples, those compositions that appeared uniformly transparent upon visual inspection and did not gel after one week or longer were adjudged to have high storage stability, and were deemed to have "passed". Further, those compositions which, when stored for at least one week at room temperature (25° C.), solidified or developed turbidity after less than one week, or suffered from gelling after less than one week, were adjudged to have low storage stability, and were deemed to have "failed". "Gelling" and "turbidity" were adjudged against the following criteria.

"Gelling": when the resin solution composition was in a state that appeared visually to lack fluidity, specifically, when the viscosity had increased by 2-fold or more, "gelling" was deemed to have occurred. Using a gelled composition in a production process is problematic.

"Turbidity": when the resin solution composition was in a state that appeared visually to have fluidity, but white cloudiness existed in the resin solution composition, "turbidity" was deemed to exist. A turbid composition requires a filtration step to remove foreign matter, or produces an accumulation of foreign matter derived from the white turbidity on the filter, and therefore causes a deterioration in the productivity of production processes.

Example 1

SUMIKAEXCEL PES4100P (manufactured by Sumitomo Chemical Company, Limited, a polyethersulfone, reduced viscosity: 0.41 dL/g) was dissolved by heating at 70° C. in a solution prepared by mixing sulfolane and γ-butyrolactone (hereinafter often abbreviated as GBL) in a mass ratio of 3:1 (25.0% by mass GBL solution) to produce an aromatic polysulfone solution with a solid fraction concentration of 20% by mass. This solution was returned to room temperature (25° C.), and after storage for one week at room temperature, the state of the solution was inspected.

Figure 1:
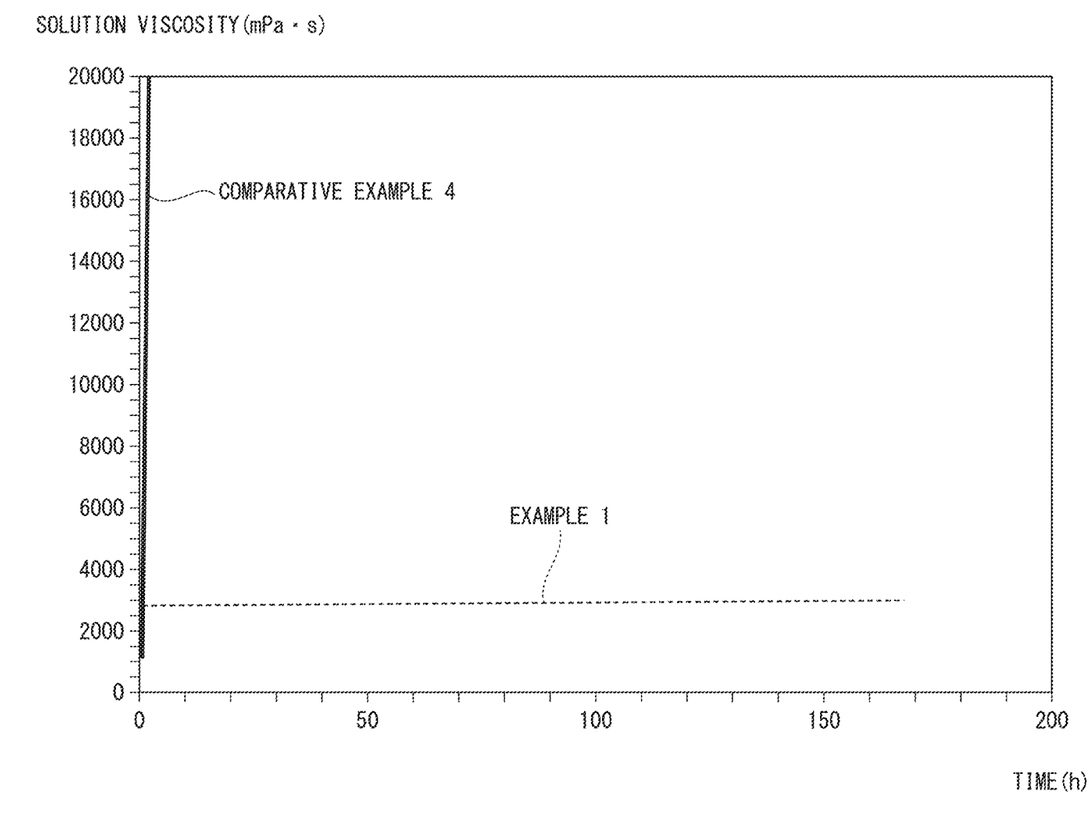
FIG. 1 is a diagram illustrating the changes over time in the viscosities of aromatic polysulfone solutions prepared in Example 1 and Comparative Example 4.

The change over time in the viscosity of the produced solution is illustrated in FIG. 1. The viscosity of the solution was measured at a measurement temperature of 23° C., using a B-type viscometer (model: TVL-20, manufactured by Toki Sangyo Co., Ltd.) and a spindle No. M2 (rotational rate: 10 rpm).

Example 2

With the exception of using a solution prepared by mixing sulfolane and GBL in a mass ratio of 1:1 (50.0% by mass GBL solution), an aromatic polysulfone solution of Example 2 was produced in the same manner as Example 1, and the state of the solution was inspected.

Example 3

With the exception of using a solution prepared by mixing sulfolane and GBL in a mass ratio of 1:3 (75.0% by mass GBL solution), an aromatic polysulfone solution of Example 3 was produced in the same manner as Example 1, and the state of the solution was inspected.

Example 4

SUMIKAEXCEL PES4100P (manufactured by Sumitomo Chemical Company, Limited, a polyethersulfone, reduced viscosity: 0.41 dL/g) was dissolved by heating at 40° C. in a solution prepared by mixing sulfolane and acetone in a mass ratio of 3:1 (25.0% by mass acetone solution) to produce an aromatic polysulfone solution with a solid fraction concentration of 20% by mass. This solution was returned to room temperature (25° C.), and after storage for one week at room temperature, the state of the solution was inspected.

Example 5

With the exception of using a solution prepared by mixing sulfolane and acetone in a mass ratio of 5:3 (37.5% by mass acetone solution), an aromatic polysulfone solution of Example 5 was produced in the same manner as Example 4, and the state of the solution was inspected.

Comparative Example 1

With the exception of not using sulfolane, an attempt was made to prepare an aromatic polysulfone solution of Comparative Example 1 in the same manner as Example 1. In this composition, the aromatic polysulfone did not dissolve, and the composition solidified immediately after preparation.

Comparative Example 2

With the exception of using a solution prepared by mixing sulfolane and GBL in a mass ratio of 7:1 (12.5% by mass GBL solution), an attempt was made to prepare an aromatic polysulfone solution of Comparative Example 2 in the same manner as Example 1. In this composition, the aromatic polysulfone did not dissolve, and the composition solidified immediately after preparation.

Comparative Example 3

With the exception of using a solution prepared by mixing sulfolane and GBL in a mass ratio of 1:7 (87.5% by mass GBL solution), an aromatic polysulfone solution of Comparative Example 3 was produced in the same manner as Example 1. Upon standing at 25° C., this solution gelled after 6 days.

Comparative Example 4

With the exception of not using GBL, an aromatic polysulfone solution of Comparative Example 4 was produced in the same manner as Example 1. Upon standing at 25° C., this solution gelled after 4 days.

The change over time in the viscosity of the produced solution is illustrated in FIG. 1. The viscosity of the solution was measured at a measurement temperature of 23° C., using a B-type viscometer (model: TVL-20, manufactured by Told Sangyo Co., Ltd.) and a spindle No. M2 (rotational rate: 10 rpm).

Comparative Example 5

With the exception of using a solution prepared by mixing sulfolane and acetone in a mass ratio of 7:1 (12.5% by mass acetone solution), an attempt was made to prepare an aromatic polysulfone solution of Comparative Example 5 in the same manner as Example 4. In this composition, the aromatic polysulfone did not dissolve, and the composition solidified immediately after preparation.

Comparative Example 6

With the exception of using a solution prepared by mixing sulfolane and acetone in a mass ratio of 13:3 (18.8% by mass acetone solution), an aromatic polysulfone solution of Comparative Example 6 was produced in the same manner as Example 4. Upon standing at 25° C., this solution gelled after 6 days.

Comparative Example 7

With the exception of using a solution prepared by mixing sulfolane and acetone in a mass ratio of 9:7 (43.8% by mass acetone solution), an attempt was made to prepare an aromatic polysulfone solution of Comparative Example 7 in the same manner as Example 4. In this composition, precipitates developed immediately after preparation, producing turbidity.

Comparative Example 8

With the exception of using a solution prepared by mixing sulfolane and acetone in a mass ratio of 1:1 (50.0% by mass acetone solution), an attempt was made to prepare an aromatic polysulfone solution of Comparative Example 8 in the same manner as Example 4. In this composition, precipitates developed immediately after preparation, producing turbidity, and the composition gelled after one month.

Example 6

SUMIKAEXCEL PES4100P (manufactured by Sumitomo Chemical Company, Limited, a polyethersulfone, reduced viscosity: 0.41 dL/g) was dissolved by heating at 40° C. in a solution prepared by mixing sulfolane, GBL and acetone in a mass ratio of 2:3:3 to produce an aromatic polysulfone solution with a solid fraction concentration of 20% by mass. This solution was returned to room temperature (25° C.), and after storage for one week at room temperature, the state of the solution was inspected.

Example 7

SUMIKAEXCEL PES4100P (manufactured by Sumitomo Chemical Company, Limited, a polyethersulfone, reduced viscosity: 0.41 dL/g) was dissolved by heating at 40° C. in a solution prepared by mixing sulfolane and methyl ethyl ketone in a mass ratio of 5:3 to produce an aromatic polysulfone solution with a solid fraction concentration of 20% by mass. This solution was returned to room temperature (25° C.), and after storage for one week at room temperature, the state of the solution was inspected.

Example 8

SUMIKAEXCEL PES4100P (manufactured by Sumitomo Chemical Company, Limited, a polyethersulfone, reduced viscosity: 0.41 dL/g) was dissolved by heating at 70° C. in a solution prepared by mixing sulfolane and γ-valerolactone in a mass ratio of 1:1 to produce an aromatic polysulfone solution with a solid fraction concentration of 20% by mass. This solution was returned to room temperature (25° C.), and after storage for one week at room temperature, the state of the solution was inspected.

TABLE 1

|  |  | Example 1 | Example 2 | Example 3 | Example 4 | Example 5 | Example 6 |
|---|---|---|---|---|---|---|---|
| Blend (% by mass) | 4100P | 20 | 20 | 20 | 20 | 20 | 20 |
|  | Sulfolane | 60 | 40 | 20 | 60 | 50 | 20 |
|  | GBL | 20 | 40 | 60 | — | — | 30 |
|  | Acetone | — | — | — | 20 | 30 | 30 |
| Physical properties | Solution state | uniformly transparent | uniformly transparent | uniformly transparent | uniformly transparent | uniformly transparent | uniformly transparent |
|  | Storage stability | at least one week | at least one week | at least one week | at least one week | at least one week | at least one week |

TABLE 2

|  |  | Example 7 | Example 8 |
|---|---|---|---|
| Blend (% by mass) | 4100P | 20 | 20 |
|  | Sulfolane | 50 | 40 |
|  | γ-valerolactone | — | 40 |
|  | Methyl ethyl ketone | 30 | — |
| Physical properties | Solution state | uniformly transparent | uniformly transparent |
|  | Storage stability | at least one week | at least one week |

TABLE 3

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Blend (% by mass) | 4100P | 20 | 20 | 20 | 20 | 20 | 20 | 20 | 20 |
|  | Sulfolane | 80 | 70 | 10 | — | 70 | 65 | 45 | 40 |
|  | GBL | — | 10 | 70 | 80 | — | — | — | — |
|  | Acetone | — | — | — | — | 10 | 15 | 35 | 40 |
| Physical properties | Solution state | solidified | solidified | uniformly transparent | uniformly transparent | solidified | uniformly transparent | turbid | turbid |
|  | Storage stability | — | — | gelled after 6 days | gelled after 4 days | — | gelled after 6 days | — | gelled after 1 month |

The above results confirmed that the present invention was useful.

INDUSTRIAL APPLICABILITY

The present invention can provide a resin solution composition that exhibits no gelling or precipitate formation and has excellent storage stability, and is therefore useful industrially.

The invention claimed is:

1. A resin solution composition comprising an aromatic polysulfone resin, a sulfone-based solvent, and an ester-based solvent, wherein
the resin solution composition is in a state in which uniform transparency is maintained and no gelling occurs after storage for at least one week at a temperature of 5 to 35° C.,
and in the resin solution composition,
an amount of the resin, relative to a total mass of the resin solution composition, is at least 10% by mass but not more than 50% by mass, and
an amount of the ester-based solvent, relative to a total amount of the sulfone-based solvent and the ester-based solvent, is at least 15% by mass but not more than 85% by mass.

2. The resin solution composition according to claim 1, wherein the ester-based solvent is γ-butyrolactone or γ-valerolactone.

3. The resin solution composition according to claim 1, wherein the ester-based solvent is γ-butyrolactone.

4. The resin solution composition according to claim 1, wherein the sulfone-based solvent is sulfolane.

5. The resin solution composition according to claim 1, wherein the aromatic polysulfone has a repeating unit represented by formula (1) shown below:

$$-Ph^1-SO_2-Ph^2-O- \quad (1)$$

wherein each of $Ph^1$ and $Ph^2$ independently represents a phenylene group; and one hydrogen atom on the phenylene group may be substituted with an alkyl group of 1 to 10 carbon atoms, an aryl group of 6 to 20 carbon atoms or a halogen atom, and when two or more hydrogen atoms on the phenylene group are substituted, each hydrogen atom may be independently substituted with an alkyl group of 1 to 10 carbon atoms, an aryl group of 6 to 20 carbon atoms or a halogen atom.

6. A resin solution composition comprising an aromatic polysulfone resin, a sulfone-based solvent, and a ketone-based solvent, wherein
the resin solution composition is in a state in which uniform transparency is maintained and no gelling occurs after storage for at least one week at a temperature of 5 to 35° C.,
and in the resin solution composition,
an amount of the resin, relative to a total mass of the resin solution composition, is at least 10% by mass but not more than 50% by mass, and
an amount of the ketone-based solvent, relative to a total amount of the sulfone-based solvent and the ketone-based solvent, is at least 20% by mass but not more than 42% by mass.

7. The resin solution composition according to claim 6, wherein the ketone-based solvent is acetone or methyl ethyl ketone.

8. The resin solution composition according to claim 6, wherein the ketone-based solvent is acetone.

9. The resin solution composition according to claim 6, wherein the sulfone-based solvent is sulfolane.

10. The resin solution composition according to claim 6, wherein the aromatic polysulfone has a repeating unit represented by formula (1) shown below:

$$-Ph^1-SO_2-Ph^2-O- \quad (1)$$

wherein each of $Ph^1$ and $Ph^2$ independently represents a phenylene group; and one hydrogen atom on the phenylene group may be substituted with an alkyl group of 1 to 10 carbon atoms, an aryl group of 6 to 20 carbon atoms or a halogen atom, and when two or more hydrogen atoms on the phenylene group are substituted, each hydrogen atom may be independently substituted with an alkyl group of 1 to 10 carbon atoms, an aryl group of 6 to 20 carbon atoms or a halogen atom.

11. A resin solution composition comprising an aromatic polysulfone resin, a sulfone-based solvent, an ester-based solvent, and a ketone-based solvent, wherein
the resin solution composition is in a state in which uniform transparency is maintained and no gelling occurs after storage for at least one week at a temperature of 5 to 35° C.,
and in the resin solution composition,
an amount of the resin, relative to a total mass of the resin solution composition, is at least 10% by mass but not more than 50% by mass,
an amount of the ester-based solvent, relative to a total amount of the sulfone-based solvent, the ester-based solvent and the ketone-based solvent, is at least 15% by mass but not more than 85% by mass, and an amount of the ketone-based solvent, relative to a total amount of the sulfone-based solvent, the ester-based solvent and the ketone-based solvent, is not more than 42% by mass.

12. The resin solution composition according to claim 11, wherein the ester-based solvent is γ-butyrolactone or γ-valerolactone.

13. The resin solution composition according to claim 11, wherein, the ester-based solvent is γ-butyrolactone.

14. The resin solution composition according to claim 11, wherein the ketone-based solvent is acetone or methyl ethyl ketone.

15. The resin solution composition according to claim 11, wherein the ketone-based solvent is acetone.

16. The resin solution composition according to claim 11, wherein the sulfone-based solvent is sulfolane.

17. The resin solution composition according to claim 11, wherein the aromatic polysulfone has a repeating unit represented by formula (1) shown below:

$$-Ph^1-SO_2-Ph^2-O- \qquad (1)$$

wherein each of $Ph^1$ and $Ph^2$ independently represents a phenylene group; and one hydrogen atom on the phenylene group may be substituted with an alkyl group of 1 to 10 carbon atoms, an aryl group of 6 to 20 carbon atoms or a halogen atom, and when two or more hydrogen atoms on the phenylene group are substituted, each hydrogen atom may be independently substituted with an alkyl group of 1 to 10 carbon atoms, an aryl group of 6 to 20 carbon atoms or a halogen atom.

* * * * *